June 29, 1965  D. C. GERBER  3,192,416
SYNCHRONOUS MOTOR WITH LIMIT CONTROL
Filed July 16, 1963

United States Patent Office 3,192,416
Patented June 29, 1965

3,192,416
SYNCHRONOUS MOTOR WITH LIMIT CONTROL
Dale C. Gerber, North Canton, Ohio, assignor to The Hoover Company, North Canton, Ohio, a corporation of Ohio
Filed July 16, 1963, Ser. No. 295,359
6 Claims. (Cl. 310—8.6)

My invention relates to small low powered piezoelectric driven synchronous motors of the type particularly designed for handling very low continuous loads, for example, the load which would be imposed on the motor by an electric clock mechanism.

My present invention is related to application Serial No. 295,464, filed July 16, 1963, entitled "Electro-Thermal Motor"; application Serial No. 295,423, filed July 16, 1963, entitled "Synchronous Electric Motor"; application Serial No. 295,463, filed July 16, 1963, entitled "Improvements in Synchronous Electric Motor"; and application Serial No. 295,424, filed July 16, 1963, entitled "Synchronous Motor and Mounting."

In particular my present invention relates to an improvement in the adjusting mechanism disclosed in application Serial No. 295,463 and is designed to provide a factory adjustment limiting the pawl excursion without requiring fine manipulation or adjustment on the part of the persons constructing the device.

In piezoelectric driven motors such as that disclosed in application Serial No. 295,423 it is desirable to provide a means which positively limits the excursion of the pawl to a fixed amount irrespective of line voltage variations. It is also desirable to provide a device in which the means, in this case stops, which determine the pawl excursion are adjusted to each particular piezoelectric drive element, ratchet, pawl and housing assembly without requiring painstaking adjustment on the part of factory personnel.

It is accordingly a principal object of my invention to provide an excursion control stop mechanism which is adjusted to fit the precise needs of each particular assemblage. The adjustment is made after complete assembly of the device and the mechanism itself adjusts its stop to the proper position requiring only energization at the factory at a controlled voltage level.

Other objects and advantages of the invention will become apparent as the description proceeds when taken in connection with the accompanying drawing wherein.

Figure 2:
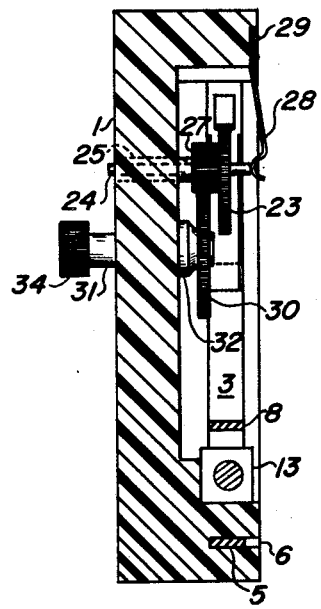
FIG. 2 is a cross-sectional view taken along the line 2—2 of FIG. 1 and looking in the direction of the arrows.
Figure 1:
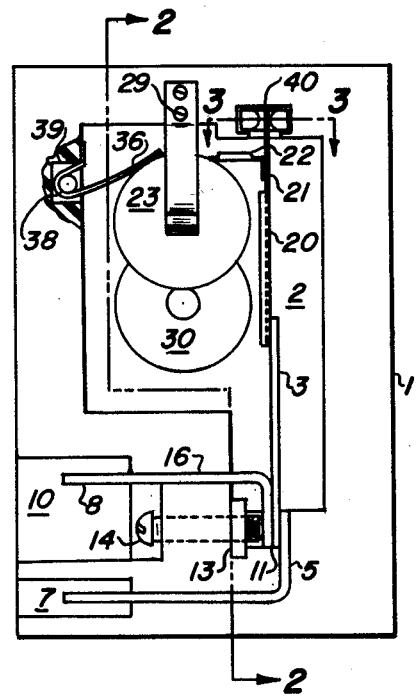
FIG. 1 is an elevational view of a piezoelectric motor embodying my invention.

The device shown in the drawing, FIGS. 1 and 2, is drawn to a scale considerably larger than the actual motor in order to facilitate illustration.

My piezoelectric motor comprises a casing 1, preferably of a molded plastic material, having an integrally molded recess 2 within which the actual mechanism of the motor is housed. The driving element of my motor comprises an elongated strip bender type piezoelectric element 3 which may be of any suitable material such as Rochelle salts or more preferably barium titanate or lead zirconate titanate, and it may be a single layer of the active material or a multiple layer secured together by being deposited on very thin brass intermediate strips as more fully described in application Serial No. 295,423.

As herein illustrated the piezoelectric element 3 and its electrical connections and mounting in the casing 1 are basically those disclosed in the copending application Serial No. 295,424. The outer faces of the element 3 are silvered to provide electrical contact thereto. The right-hand face of element 3, as viewed in FIG. 1, abuts a conductor bar 5 which is mounted in an L-shaped slot 6 extending into the body of the housing or frame 1. The free end of the conductor bar 5 extends into a recess 7 formed in housing 1 so that electrical connection may be made to the bar 5 within the perimeter of housing 1. The left-hand face of element 3, as viewed in FIG. 1, is abutted by a second L-shaped conductor bar 8 having a free end which projects into a second enlarged recess 10 within the confines of the housing 1 to permit ready electrical connection thereto.

As shown most clearly in FIG. 1 the lower end of element 3 is sandwiched between the angularly bent ends of conductor bars 5 and 8 in a small downwardly projecting section of recess 2 indicated by reference character 11. A captive nut 13 is seated in the recess 11 in spaced relation to the conductor bar drive element assembly. A stud 14 projects through a suitable bore connecting the recesses 10–11 and is threaded into the captive nut 13. The free end of stud 14 bears against the left-hand face of conductor bar 8, as viewed in FIG. 1, to force the two conductor bars with the interposed piezoelectric element into engagement with each other and against the right-hand end of the recess 11 thereby providing a firm mounting for these parts and insuring good electrical connection between the silvered faces of element 3 and the conductor bars 5 and 8. The conductor bar 8 is mounted in a slot 16 which is similar to slot 6 and interconnects the lower end of recess 2 and the recess 10 to provide ready insertion of the bar into its proper relative position in the apparatus.

The piezoelectric drive element as herein disclosed is of the bender type and is approximately seven-eighth of an inch in length of which approximately one-eighth of an inch is clamped between the conductor bars 5 and 8. A light weight channel shaped thin stainless steel metal extender member 20 is cemented to the upper free end of the member 3 and is provided with a projecting flat extension 21 extending upwardly therefrom for a purpose to be more fully described hereinafter.

A small very thin stainless steel sheet metal pawl 22 is cemented to the projecting member 21 and has an end portion bearing upon a rachet wheel 23. As more fully described in the aforementioned cases, the ratchet wheel 23 preferably comprises a wheel of half inch diameter made of molded plastic provided with 250 peripheral teeth and has a mass of less than one gram.

The ratchet wheel 23 is press fitted upon a small spindle 24 which is journaled in a bushing 25 press fitted in the casing 1. The shaft 24 also carries a small spur gear 27 press fitted thereon and abutting the rachet wheel 23. The outer projecting end of the shaft 24 is engaged by a light weight, soft spring 28 secured by small screws 29 in the casing 1. The small spring 28 serves to urge the shaft of spindle 24 lightly to the left, as viewed in FIG. 2, to maintain the end face of spur gear 27 in engagement with the bushing 25. The spur gear 27 is meshed with a larger diameter spur gear 30 which is pressed fitted on a shaft 31 rotatably supported in a bushing 32 also press fitted in housing 1. The outer free end of shaft 31 carries a small spur gear 34 which is the output gear of the motor and which may be engaged with a drive gear of a standard electric clock reduction gear train.

The pawl 22 is of springy material and is lightly biased to remain in engagement with the fine teeth on the periphery of the ratchet wheel 23. Hence, when the conductors 5 and 8 are connected to opposite sides of a service line, for example an alternating supply line at nominal 120 volts and 60 cycles per second, the piezoelectric element 3 will vibrate at this frequency and impart 60 driving strokes per second to the ratchet wheel 23 to produce rotation of the output gear 34 at a speed which is synchronous with line frequency.

A light weight leaf spring 36 has a free end bearing on the periphery of the wheel 23 within an angle of less than 90° from the point at which the pawl 22 engages that wheel. The spring 36 is mounted in housing 1 by being bent around a pin 38 which passes through a small recess 39 opening off the main recess 2. The function of the spring 36 is to bring the wheel 23 to a stop almost immediately upon the termination of a driving stroke of the pawl 22 and to prevent reverse rotation of the wheel as the pawl is withdrawing preparatory to starting the next following driving stroke.

Within the dimensions given herein the span of each tooth on the wheel 23 is slightly in excess of six thousandth of an inch; hence, any excursion of the pawl which is less than twelve thousandth of an inch and greater than about seven thousandth of an inch will assure that the pawl will advance the ratchet wheel only one tooth per driving stroke thereof. This differential allows the device to be self-compensating for normal line voltage variations which are met in domestic service. In some areas and under some conditions the line voltage in household service may vary so widely as to exceed acceptable limits. The present invention is primarily concerned with devising an arrangement to accommodate these extreme situations.

Piezoelectric drive elements such as the element 3 flex in response to a change in potential across opposite faces thereof. The degree of flexure of the driver element 3 is roughly proportional to the applied voltage. In production lots individual piezoelectric elements vary somewhat from each other, that is two seemingly identical elements will flex to different degrees when subjected to the same electrical stress, this being caused by differences in thickness of piezoelectric material and other minor production differences which will occur between individual members of a given production lot. Because of these factors particularly it is necessary to provide means to insure that the pawl 22 has a minimum travel of about seven thousandth of an inch when subjected to the minimum expected line voltage and does not have a travel in excess of about twelve thousandth of an inch in response to abnormally high line voltages. Since these piezoelectric motors are low cost devices, factory adjustments must be performed at minimum cost. My present construction provides an inexpensive and reliable means by which the excursion of the pawl 22 is reliably controlled without requiring extensive factory adjustment.

Figure 3:
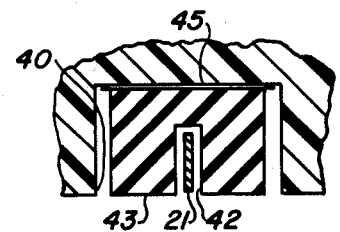
FIG. 3 is a cross-sectional view on a larger scale of a portion of the device taken along the line 3—3 of FIG. 1 and looking in the direction of the arrows.

As is seen most clearly in FIGS. 1 and 3 the casing 1 is provided with an outwardly facing recess 40 opening at its lower end into the recess 2. The metallic extender 20 attached to the piezoelectric element has a plane extender part 21 which extends well into the recess 40 and is received in a slot 42 formed in a light weight rubber stop member 43 which is somewhat smaller than the dimensions of the recess 40 and is secured firmly in place by cement 45.

The width of the slot 42 is chosen with reference to the thickness of the metal member 21 so as to permit an excursion of the pawl 22 of not less than seven thousandth of an inch nor more than twelve thousandth of an inch considering all tolerances which may be accumulated in manufacture at this point.

The adjustment of the stop member 43 is accomplished as follows. The device is completely assembled except for the introduction of the cement 45. Electrical connections are made to the conductors 5 and 8 but the line is not energized at this time. The device wil be laid on a horizontal support so that the exposed face, as shown in FIG. 1, will be facing vertically upwardly. A small amount of thin, fast drying cement will be injected beneath the block 43 using a needle or a similar suitable means. Immediately the cement is injected, the line is energized, preferably at a voltage level close to the minimum voltage which could reasonably be expected to be encountered in practice, and the device is permitted to run for the minute or two which is required for the cement 45 to set up, harden and permanently anchor the block 43 in position.

The piezoelectric element automatically adjusts the block 43 as the cement thickens up and finally sets in the following manner. As the member 21 vibrates it will strike one side or the other of the opposed faces of slot 42 a harder blow and, hence, tend to move the block 43 in that direction. Assuming, for example, that the block 43 in FIG. 3 is positioned too far to the left, the right-hand face of slot 42 will be repeatedly struck a harder blow than that which is applied to the left-hand face of the slot 42 and will, hence, produce a net force which slips the block 43 to the right as viewed in FIG. 3. This process will continue and in a few seconds the block 43 will be in its proper position such that the opposite faces of slot 42 receive substantially equal blows from the member 21. The stop and cement impose a resistance to motion so great that a single impact from the vibrating structure is insufficient to impart motion to the stop greater than a small fraction, no more than 10%, of the pitch of a single ratchet tooth when the cement or adhesive is first applied. Initially while the cement is thin the block 43 will tend to oscillate on opposite sides of its adjusted position; however, as the cement 45 thickens and sets up, the resistance to movement of the block 43 will increase progressively to what amounts to an absolute resistance insofar as the member 21 is concerned; however, this position is the adjusted position of the stop for the particular piezoelectric element and pawl-ratchet combination.

It will be seen from the foregoing that this method of establishing the limits of the excursion of the pawl 22 and the final position of the stop 43 requires no adjustment at all on the part of the operator; it is merely necessary to inject the cement and allow the device to run for a short period of time until the cement sets up, at which time it will be found that block 43 has assumed its optimum adjusted position in which it becomes permanently fixed when the cement 45 finally sets up.

In performing the foregoing operation it is preferable that the motor be under its normal load. For example, if the motor is to run a clock, the final manufacturing operation should be upon the completed clock. Failing that, it is desirable to impose an artificial load approximating the known load to which the motor is to drive by gearing the same to the gear 34.

At line voltages exceeding the minimum voltage used in factory adjustment the member 21 will strike opposite faces of slot 42 with a greater force proportional to the excess of actual line voltage over the adjustment voltage. This excess blow will, of course, apply some mechanical strain to the piezoelectric element 3, but it is well within its tolerance and does no harm while assuring that the excursion of the pawl is restrained to prevent the pawl from moving a distance sufficient to pick up more than one tooth upon each driving stroke thereof.

In the drawing the member 21 is shown in its unenergized condition and is shown as lying centrally within the confines of the slot 42. This is not precisely the condition which the parts assume once the cement 45 has set up, as the unenergized condition of member 21 will be slightly closer to the face of slot 42 on the side of the pawl than it will be to the return stroke face of the slot 42. This is because the piezoelectric assembly is carrying a load on the driving stroke thereof which reduces the force of the blow struck on that side of the slot 42 during the adjustment procedure.

From the foregoing it will be appreciated that the extended portion of the member 21 which is received in the slot 42 in and of itself constitutes a vibrating member whose total excursion is to be limited by the opposing surfaces of slot 42. The width of the slot 42 is equal to the thickness of the member 21 plus the desired travel or excursion thereof. Though as shown herein the member 21 is a metallic extension on the extender 20 for the drive member 3, this portion of the apparatus could be a strip of rubber or similar sound deadening and elastic material cemented to the upper end of member 20 and also providing the mount for the pawl as described in application Serial No. 295,463. By making this part of the apparatus of rubber or rubber-like material, noise generated by the pawl clicking over the teeth on the wheel 23 is effectively isolated from metallic member 20. If the member 21 is made of rubber it is not essential that the member 43 be of rubber or similar material though that is preferable in this instance also as a further sound deadening arrangement.

It will be appreciated that the extent of the recess 40 in the line of the direction of vibration of member 21 must be larger than the dimensions of the block 43 in the same direction to allow the possibility of a considerable number of possible final positions of block 43. As a practical matter a clearance equal to about three times the pitch of one tooth on the ratchet wheel is sufficient to accommodate individual variations in piezoelectric elements 3 and tolerance variation in it and the elements on which it is directly mounted and its mounting between the conductor bars 5 and 8.

My invention provides a simple and economical method of providing a restraining stop to control the excursion of the driving pawl without requiring any fine adjustments on the part of the operator and a stop system which automatically adjusts itself during the manufacturing operation to the particular motor in which it is to be used.

While I have illustrated and described my invention in connection with a piezoelectric drive motor, it will be understood that the principles of the invention and structures thereof are equally applicable to other types of motor drives wherein rotary motion is obtained from the vibrating, oscillating or reciprocating action of a small pawl which operates at a high rate of speed through a very small range of operation. For example, the pawl could be driven by a thermal wire device such as that disclosed in Application Serial No. 295,464.

I claim:

1. A synchronous electric motor comprising a frame, a fine ratchet wheel rotatably supported by said frame, an electrically energized means adapted to vibrate at the frequency of an applied alternating current, a pawl drivingly engaging said ratchet wheel and coupled to be driven by said means, an abutment stop having a slot receiving a part of said vibrating means to limit the excursion of said pawl to the net clearance of said slot, said abutment stop being positioned and secured to said frame with the said part of said vibrating means lying in the approximate center of said slot when said means is not energized.

2. A synchronous electric motor of the type having a frame, a ratchet wheel rotatably mounted on the frame, a pawl drivingly engaging the wheel and an electrically energized means adapted to vibrate said pawl synchronously with the frequency of an energizing alternating current characterized by the provision of a member rigidly coupled to the pawl, a stop member including a pair of abutment surfaces, one on each side of said member to limit movement thereof, said member being secured to said frame by an adhesive.

3. The method of positioning an abutment stop for limiting the excursion of a high speed vibrating member subject to variation in excursion resulting from a variation in driving energization comprising the steps of providing a stop member having a slot therein receiving a portion of the vibrating member with the clearance space between the opposite faces of the slot and the surfaces of the vibrating member facing said faces equal to the desired excursion of the vibrating member, placing the stop member on a surface having an extent sufficient to allow movement of the stop member in the line of action of said vibrating member, applying a thin, fast setting adhesive to the contacting areas of said stop member and said surface and energizing said vibrating member at a controlled level of energization while said adhesive is setting up to secure said stop member permanently in its adjusted position when said adhesive is set up.

4. The method of adjusting the position of an abutment stop for a vibrating member subject to variation in excursion in which the abutment stop includes a slot receiving a portion of the vibrating member and the opposite sides of the slot form abutments for engagement by opposite faces of the vibrating member to limit its excursion which comprises the steps of introducing a thin, fast setting adhesive between the abutment stop and its support and energizing the vibrating member under controlled conditions to impart vibration producing energy thereto at a fixed level while said adhesive is setting up to secure the abutment stop in fixed position when the adhesive is set up.

5. The method of adjusting the position of a limit stop in a motor of the type having an electrically energized vibratory system including a vibratory element subject to variations in excursion in response to variations in the level of energization of the vibratory system, a limit stop having opposed stop surfaces positioned on opposite sides of the vibratory element and spaced to allow only a predetermined maximum excursion of the vibratory element and a frame structure upon which the parts of the vibratory system and limit stop are mounted, which includes the steps of movably attaching the limit stop to the frame structure in approximate adjusted position by a means which allows movement of the stop on the frame and moving the limit stop while it is movably secured to the frame structure to its adjusted position against the resistance of the limit stop and the securing means by energizing the vibratory system at a controlled level of energization sufficient to produce an unrestrained excursion of the vibratory element in excess of the said predetermined maximum excursion.

6. The method of claim 5 wherein the combined resistance to motion imposed on the limit stop by the limit stop and its securing means limits such motion resulting from a single impact of the vibratory element to an amount not more than about 10 percent of said predetermined excursion.

References Cited by the Examiner

Piezo-Electricity, pages 673–674, by W. G. Cody, published by McGraw-Hill Company, 1946.

MILTON O. HIRSHFIELD, *Primary Examiner.*